United States Patent [19]
Ward et al.

[11] Patent Number: 5,531,353
[45] Date of Patent: Jul. 2, 1996

[54] DRINKING CUP DEVICE

[76] Inventors: Ronald K. Ward, 600 W. Fredericksburg; William M. Ward, 10700 S. Lynn La., both of Broken Arrow, Okla. 74011

[21] Appl. No.: 329,482

[22] Filed: Oct. 26, 1994

[51] Int. Cl.⁶ ..................................................... A45F 3/18
[52] U.S. Cl. ..................... 220/729; 220/23.86; 220/522; 220/630
[58] Field of Search ................... 220/729, 737, 220/738, 630, 636, 425, 469, 23.83, 23.86, 522

[56] References Cited

U.S. PATENT DOCUMENTS

| | | |
|---|---|---|
| D. 219,024 | 10/1970 | Onodera et al. . |
| D. 220,402 | 4/1971 | Phillips . |
| D. 239,428 | 4/1976 | Cummings . |
| D. 247,840 | 5/1978 | Dixson . |
| D. 252,604 | 8/1979 | Harris . |
| D. 259,012 | 4/1981 | Harris . |
| D. 309,848 | 8/1990 | Sokolski et al. . |
| D. 310,781 | 9/1990 | Scott, III . |
| D. 317,240 | 6/1991 | Bridges . |
| D. 346,933 | 5/1994 | Denny et al. . |
| 1,778,175 | 10/1930 | Thune ................................. 220/630 X |
| 2,895,636 | 7/1959 | Martin .................................... 220/425 |
| 3,051,303 | 8/1962 | Daanen et al. ...................... 220/630 X |
| 3,111,942 | 11/1963 | Miller . |
| 3,348,716 | 10/1967 | Nakata ............................. 220/23.86 X |
| 3,496,349 | 2/1970 | Townsend ............................. 220/23.86 |
| 3,526,335 | 9/1970 | Swett et al. ...................... 220/23.83 X |
| 3,684,123 | 8/1972 | Bridges . |
| 3,844,450 | 10/1974 | Johnson . |
| 3,883,029 | 5/1975 | Wyatt . |
| 3,910,441 | 10/1975 | Bramming . |
| 3,949,876 | 4/1976 | Bridges . |
| 3,961,720 | 6/1976 | Potter, Jr. . |
| 4,040,549 | 8/1977 | Sadler ................................. 220/737 X |
| 4,083,467 | 4/1978 | Mullins et al. . |
| 4,160,570 | 7/1979 | Bridges . |
| 4,220,462 | 9/1980 | Frazier . |
| 4,251,252 | 2/1981 | Frazier . |
| 4,303,171 | 12/1981 | Schremmer . |
| 4,320,856 | 3/1982 | Stewart et al. . |
| 4,795,028 | 1/1989 | Wittig et al. ...................... 220/23.83 X |
| 4,896,858 | 1/1990 | Sokolski et al. . |
| 4,974,741 | 12/1990 | Gustafson et al. . |
| 5,029,720 | 7/1991 | Bridges . |
| 5,105,081 | 4/1992 | Kelly . |
| 5,134,286 | 7/1992 | Kelly . |
| 5,173,602 | 12/1992 | Kelly . |

*Primary Examiner*—Steven M. Pollard
*Attorney, Agent, or Firm*—Head Johnson & Kachigian

[57] ABSTRACT

A drinking cup device which includes a drinking cup having an open top and a base. A storage portion may be connected and disconnected from the base of the cup portion. A cylindrical shoulder on the cup portion base mates with an open top on the storage portion. A removable lid has an upper side and a lower side. The upper side of the lid receives either the cup portion base or the storage portion.

14 Claims, 3 Drawing Sheets

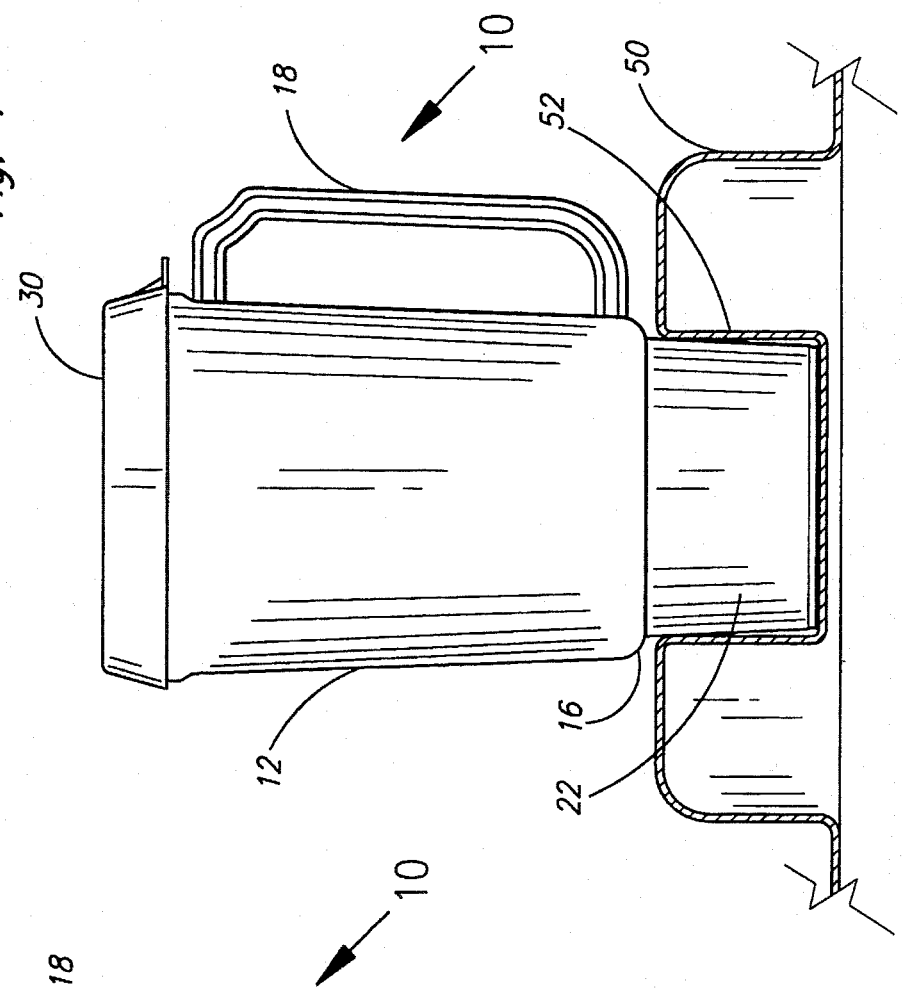
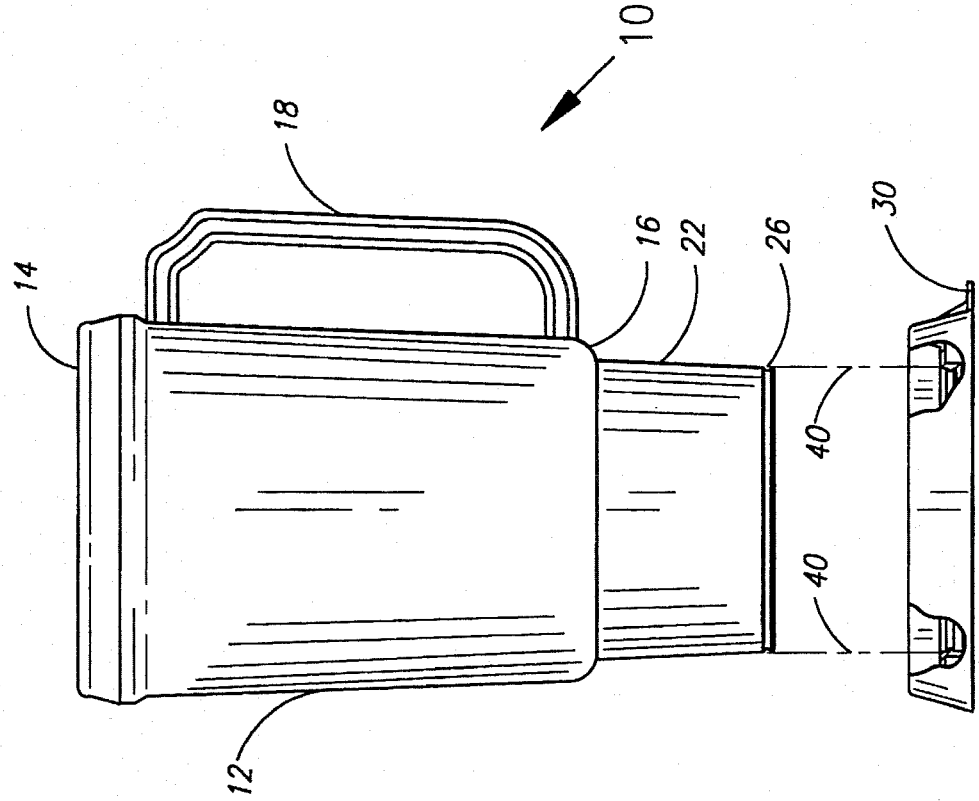

DRINKING CUP DEVICE

BACKGROUND OF THE INVENTION

1. Field of the Invention

The present invention relates to a drinking cup device that may be utilized with a variety of drinking cups and liquid storage containers. In particular, the present invention is directed to a drinking cup device that has a detachable member which may be used for storage and which acts to position the drinking cup device within a receptacle or holder.

2. Prior Art

Many different types of drinking cups, drinking mugs, glasses and other liquid storage devices have been developed over the years. One type of drinking cup device is an insulated mug which includes an inner liner and an exterior shell spaced from the inner liner. The insulated mug retains hot beverages within the mug and reduces the normal amount of heat transfer.

Another type of drinking cup device are the large liquid containers with removable tops such as a twenty or twenty-two ounce mug which store a large amount of liquid.

A drawback to these types of devices is that the exterior diameter will not fit within storage receptacles or holders such as trays, to hold multiple cups or receptacles, or within holding rings in vehicle built-in beverage holders.

Often times, the drinking mugs must be transported to various locations. As an example, a drinking mug may be taken from the home to a vehicle to be transported and then to the work site. It would be advantageous to have an insulated mug that will retain liquid and fit within standard size beverage holders. It would additionally be advantageous to have a storage area to store items such as change or keys.

Accordingly, it is a principal object and purpose of the present invention to provide a multi-use drinking cup device having a storage portion that is detachable from the drinking cup portion.

It is a further object and purpose of the present invention to provide a drinking cup device having a storage portion which also acts as a positioning member for a receipt in a receptacle or holder.

It is a further object and purpose of the present invention to provide a drinking cup device having a removable storage portion and a removable lid wherein the upper side of the upper lid will attach with either the base of the cup portion or the base of the storage portion.

SUMMARY OF THE INVENTION

The present invention provides a drinking cup device for holding liquids such as soft drinks, coffee and other hot and cold beverages. The device includes a liquid storage portion, which, in the present embodiment is in the form of a cup. A cup portion includes an open top and a base opposed to the open top. A cup portion may also include a handle for ease of holding.

The base of the cup portion terminates in the cylindrical shoulder co-axial with the cup portion having a smaller diameter than the cup portion. The drinking cup device includes a storage portion in the shape of a frustum having a circular open top. The storage portion acts as a container to store items and also serves as a receptacle positioning member in order to retain the drinking cup device within a receptacle or opening. The cylindrical shoulder of the cup base may be received in the open top of the storage portion with the storage portion coaxial with the cup.

The storage portion includes a base having a exterior diameter substantially equal to the diameter of the cylindrical shoulder of the cup portion base. The storage portion may be connected to the cup portion base in one configuration and be disconnected from the cup portion base in an alternate configuration.

The drinking cup device also includes a removable lid having an upper side and a lower side. The lower side meets with the open top of the cup portion in order to seal the open top of the cup.

The upper side of the lid has a recess designed to receive the cylindrical shoulder of the cup portion base. Accordingly, the lid may be removed and act as a coaster to hold the base of the cup portion and also to add lateral stability to the drinking device when placed on a table or other surface. The recess in the lid upper side will also receive the face of the storage portion. When the storage portion is received therein, the lid acts as a coaster and also acts to provide lateral stability to the drinking cup device when placed on a table or other surface.

The cylindrical shoulder of the cup portion base includes a circumferential recess which mates with a circumferential projection in the storage portion in the circular open top. When the circumferential projection mates with the circumferential recess, the storage portion is detachably joined to the base of the cup portion.

The exterior diameter of the storage portion is designed to fit within standard receptacles or holding rings so that the drinking cup device may be held securely therein.

BRIEF DESCRIPTION OF THE DRAWINGS

FIG. 3 is a partially exploded view of the drinking cup device shown in FIG. 1 with the removable lid utilized as a base coaster; and FIG. 4 is a plan view of the drinking cup device shown in FIG. 1 inserted into a tray or other receptacle shown in cross-section.

DETAILED DESCRIPTION OF THE PREFERRED EMBODIMENTS

Figure 1:
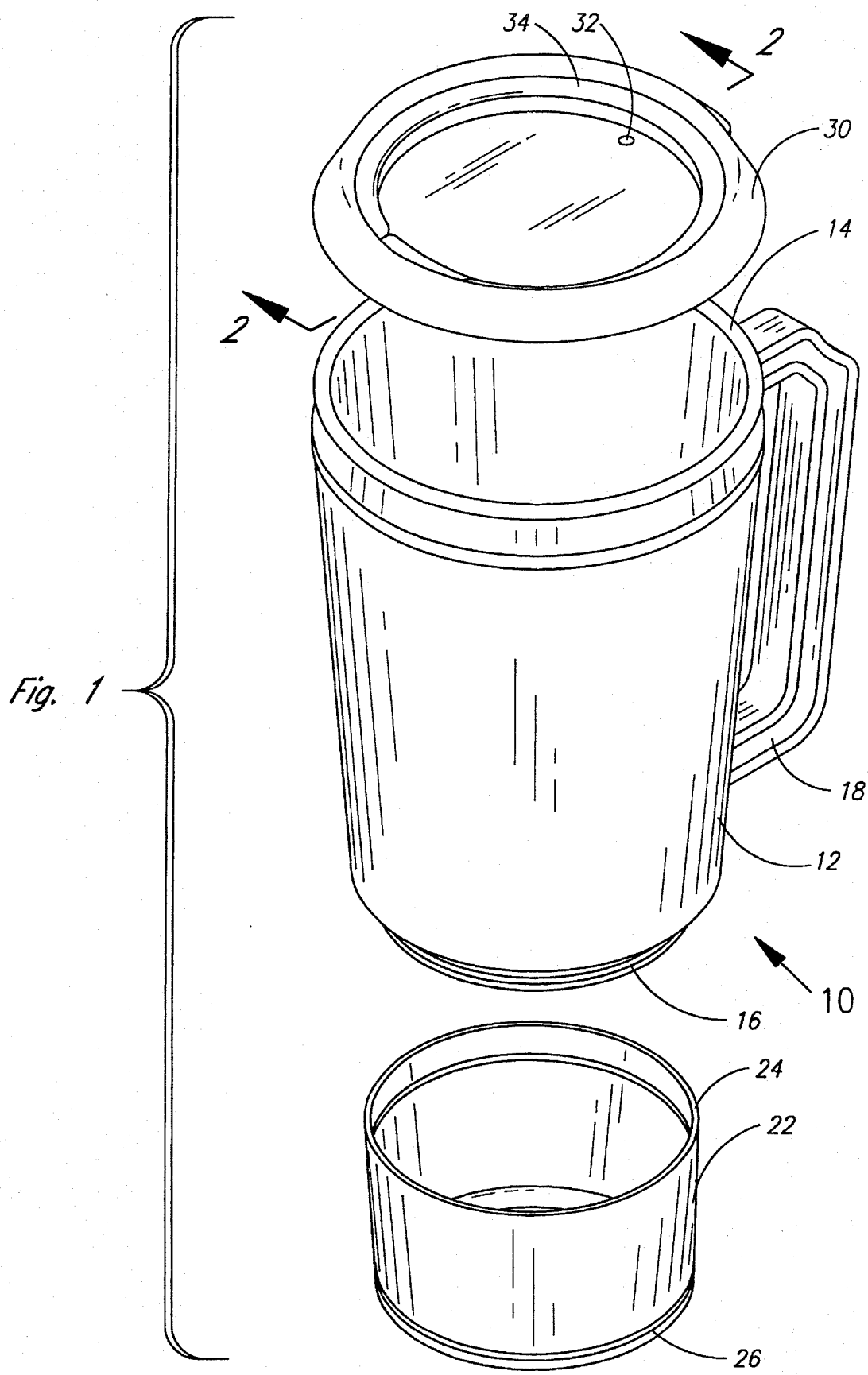
FIG. 1 is an exploded perspective view of a drinking cup device constructed in accordance with the present invention.

Referring to the drawings in detail, FIG. 1 illustrates an exploded view of a drinking cup device 10 for holding liquids. Examples of liquids to be stored are soft drinks, coffee and other beverages. The device includes a liquid storage portion which, in the present embodiment, is in the form of a cup 12. As is well known, the cup 12 is either cylindrical or frusto-conical. The cup portion 12 includes an open top 14. The cup portion also includes a base 16 opposed to the open top 14.

The cup portion 12 may also include a handle 18. With reference to the exploded sectional view shown in FIG. 2 and continuing reference to FIG. 1, the base 16 of the cup portion 12 terminates in a cylindrical shoulder 20. The cylindrical shoulder is coaxial with the cup portion and has a slightly smaller diameter.

The drinking cup device 10 includes a storage portion 22 in the shape of a frustum having a circular open top 24. The largest diameter of the storage portion 22 is at the open top. As will be seen herein, the storage portion 22 serves two functions. It acts as a storage container to store items that may travel along with the drinking cup device such as change, keys, sugar, sweetener or other items to be used with the drinks. The storage portion 22 also serves as a receptacle positioning member in order to retain the entire drinking cup device within a receptacle.

The open top of the storage portion 22 has an interior diameter only slightly larger than that of the cylindrical shoulder 20 on the base 16 of the cup portion. Accordingly, the cylindrical shoulder 20 may be received into the open top 24 of the storage portion 22, with the storage portion coaxial with the cup. When the cup base 16 is joined with the storage portion, a closed container is formed.

The storage portion 22 includes a base 26 having an exterior diameter substantially equal to the diameter of the cylindrical shoulder 20 of the cup portion base. The storage portion 22 may be connected to the cup portion base and may also be disconnected from the cup portion base in an alternate configuration. When the storage portion is connected to the cup portion base, the storage portion and the cup portion are in axial alignment and the storage portion is completely closed to form a closed container. When the storage portion is disconnected from the cup portion, access may be gained to the storage portion through its open top 24.

It will be appreciated that the device may be used for its intended purpose with the storage portion connected or disconnected.

The drinking cup device 10 also includes a removable lid 30. In the present embodiment, the lid 30 has a substantially circular exterior edge and may include a vent hole 32.

The removable lid 30 includes an upper side 34 and a lower side 36. The lower side 36 mates with the open top 14 of the cup portion 12. The lower side of the lid has the same contours as the cup open top. As illustrated by the dashed lines 38 in FIG. 2. Accordingly, the lid provides a mechanism to seal the open top 14 of the cup. When the lid is removed, the cup portion may be filled with liquid. When the lid is secured to the open top 14, liquid is prevented from being accidently spilled out.

The upper side 34 of the lid 30 has a recess designed to receive the cylindrical shoulder cup portion base 16. Accordingly, the lid 30 may be removed and also act as a coaster to hold the base 16 of the cup portion and also to add lateral stability to the drinking cup device when placed on a table or other surface.

The recess in the lid upper side 34 will also receive the base 26 of the storage portion 22 as best seen in FIG. 3. Dashed lines 40 illustrate the connection between the base 26 of the storage portion 26 and the lid upper side 34. When received therein, the lid acts as a coaster and also acts to provide lateral stability to the drinking cup device when placed on a table or other surface.

It will also be appreciated from FIG. 3 and its description, that the drinking cup device 10 may be arranged in order to stack a plurality of the drinking cup devices together in axial alignment. With the three component parts assembled, the storage portion base 26 of one device may be connected to the lid upper side 34 of another device. Accordingly, the device will allow storage of multiple devices for transportation, storage and display.

Figures 2, 5:
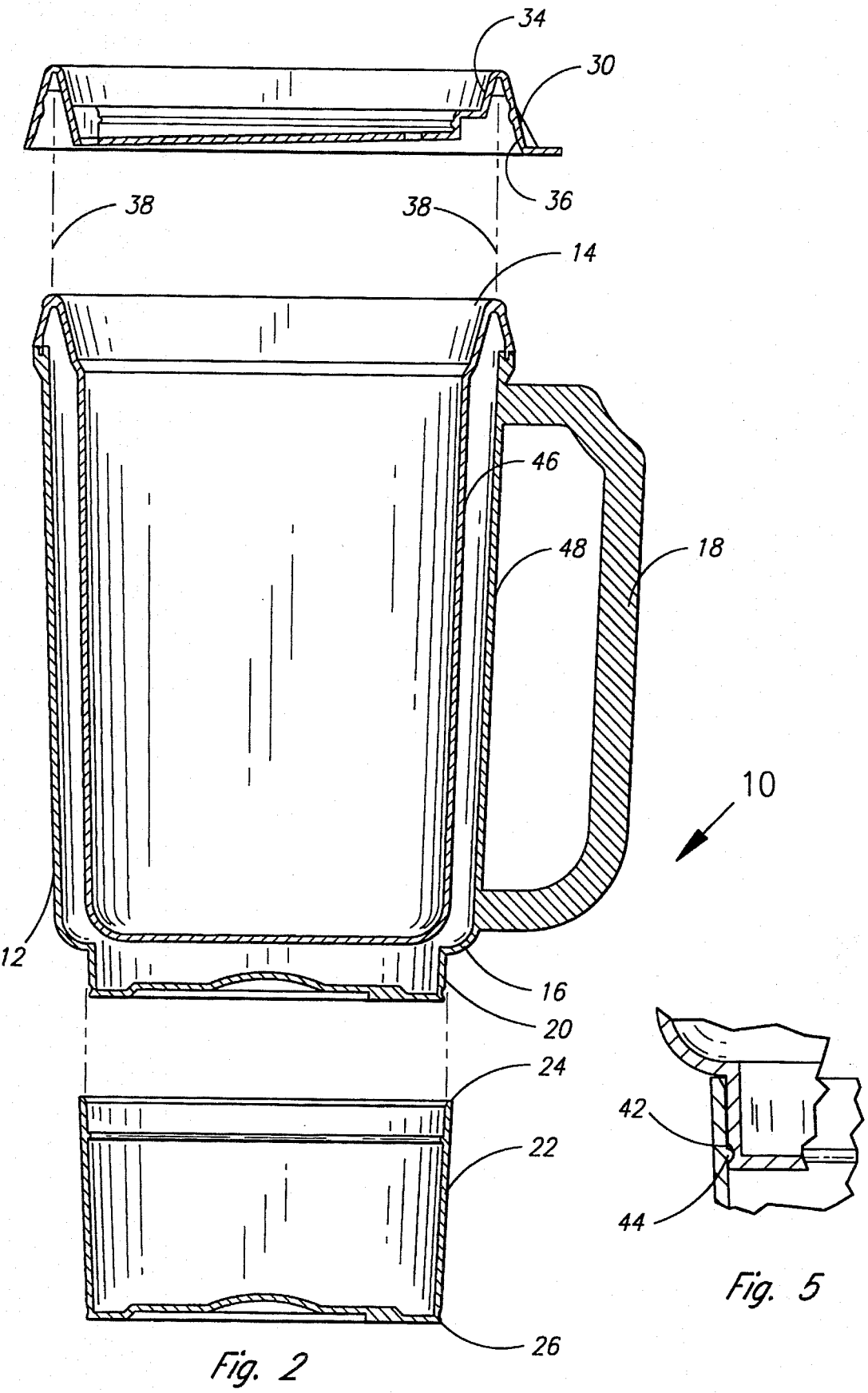
FIG. 2 is a sectional view taken along section line 2—2 of FIG. 1.

Returning to a consideration of FIG. 2, the cylindrical shoulder 20 of the cup portion base 16 includes a circumferential recess 42 which mates with a circumferential projection 44 in the storage portion 22 near the circular open top 24. When the circumferential projection mates with the circumferential recess, the storage portion is detachably joined to the base of the cup portion. A secure snap fit is thus obtained. It will be recognized that various other detachable connections may be employed, such as a friction fit, a threaded connection or other mechanisms.

With continuing consideration of FIG. 2, it will be observed that the cup portion 12 includes an inner liner 46 and an exterior shell 48 spaced from the inner liner. In the present embodiment, an air pocket separates the inner liner 46 from the exterior shell 48, although insulation may be provided. While the insulated cup portion minimizes heat transfer, the diameter of the shell is larger than a normal cup or glass.

FIG. 4 illustrates the drinking cup device 10 held within a tray 50 having a receptacle 52. The exterior diameter of the storage portion 22 is slightly less than the diameter of the receptacle 52 so the storage portion fits therein. The drinking cup device 10 may also be utilized wherein the storage portion fits within a holding ring or other receptacle. An example would be the holding rings provided in a vehicle.

The components may be made of plastic through injection molding or other process.

Whereas, the present invention has been described in relation to the drawings attached hereto, it should be understood that other and further modifications, apart from those shown or suggested herein, may be made within the spirit and scope of this invention.

What is claimed is:

1. A drinking cup device including a cup portion having an open top and a base, which drinking cup device comprises:

a removable lid, said lid including an upper side and a lower side, said lower side mating with said cup portion open top;

a portable storage portion;

means to connect and disconnect said storage portion from said cup portion base; and means to receive said cup portion base in said lid upper side or to receive said storage portion in said lid upper side.

2. A drinking cup device as set forth in claim 1 wherein said cup portion base terminates in a cylindrical shoulder.

3. A drinking cup device as set forth in claim 2 wherein said storage portion is in the shape of a frustum having a circular open top, said storage portion open top having the same interior diameter as said cylindrical shoulder.

4. A drinking cup device as set forth in claim 1 wherein said means to connect and disconnect said storage portion from said cup portion base includes a cylindrical shoulder having a circumferential projection which mates with a circumferential recess in a circular open top on said storage portion.

5. A drinking cup device as set forth in claim 1 wherein said storage portion includes a base having a diameter substantially equal to the diameter of said cup portion base.

6. A drinking cup device as set forth in claim 1 including means to stack a plurality of said drinking cup devices.

7. A drinking cup device as set forth in claim 1 wherein said cup portion includes an inner liner and a spaced exterior shell to reduce heat transfer.

8. A drinking cup device as set forth in claim 1 wherein said cup portion includes a handle.

9. A drinking cup device which comprises:

a drinking cup having an open top and a base;

a portable storage portion;

a removable lid having an upper side and a lower side, said lower side mating with said cup portion open top;

means to receive said cup portion base in said lid upper side or to receive said storage portion in said lid upper side: and means to connect and disconnect said storage portion from said cup portion base, said means including a cylindrical shoulder on said cup portion base which mates with an open top on said storage portion.

10. A drinking cup device as set forth in claim 9 including a circumferential projection on said cylindrical shoulder which mates with a circumferential recess in said open top storage portion.

11. A drinking cup device as set forth in claim 9 wherein said storage portion includes a base having a diameter substantially equal to the diameter of said cup portion base.

12. A drinking cup device which comprises:

a liquid storage container having a base;

a portable receptacle positioning member;

means to attach said member to said base for storage in a receptacle;

means to detach said member from said base;

a removable lid having an upper side and a lower side, said lid lower side mating with an open top on said liquid storage portion; and means to receive said liquid storage portion base in said lid upper side and to receive said receptacle positioning member in said lid upper side.

13. A drinking cup device as set forth in claim 12 wherein said liquid storage portion base terminates in a cylindrical shoulder.

14. A drinking cup device as set forth in claim 12 wherein said liquid storage portion includes an inner liner and a spaced exterior shell to reduce heat transfer.

\* \* \* \* \*